US010556831B2

(12) United States Patent
Ackerman et al.

(10) Patent No.: US 10,556,831 B2
(45) Date of Patent: Feb. 11, 2020

(54) METHOD OF MANUFACTURING CERAMIC MATRIX COMPOSITE OBJECTS

(71) Applicant: MBDA UK LIMITED, Stevenage Hertfordshire (GB)

(72) Inventors: Terence Ackerman, Stevenage Hertfordshire (GB); Christopher Peter Pickford, Stevenage Hertfordshire (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 393 days.

(21) Appl. No.: 15/033,717

(22) PCT Filed: Oct. 29, 2014

(86) PCT No.: PCT/EP2014/073259
§ 371 (c)(1),
(2) Date: May 2, 2016

(87) PCT Pub. No.: WO2015/063178
PCT Pub. Date: May 7, 2015

(65) Prior Publication Data
US 2016/0289127 A1    Oct. 6, 2016

(30) Foreign Application Priority Data

Nov. 1, 2013   (EP) ..................................... 13275276
Nov. 1, 2013   (GB) ................................... 1319366.9

(51) Int. Cl.
| C04B 37/00 | (2006.01) |
| C04B 35/52 | (2006.01) |
| C04B 35/573 | (2006.01) |
| C04B 35/80 | (2006.01) |
| C04B 35/83 | (2006.01) |
| C04B 35/622 | (2006.01) |
| C04B 35/64 | (2006.01) |
| C04B 35/65 | (2006.01) |

(52) U.S. Cl.
CPC .......... *C04B 37/001* (2013.01); *C04B 35/521* (2013.01); *C04B 35/573* (2013.01); *C04B 35/62277* (2013.01); *C04B 35/64* (2013.01); *C04B 35/65* (2013.01); *C04B 35/806* (2013.01); *C04B 35/83* (2013.01); *C04B 37/008* (2013.01); *C04B 2235/48* (2013.01); *C04B 2235/5248* (2013.01); *C04B 2235/5256* (2013.01); *C04B 2235/612* (2013.01); *C04B 2235/614* (2013.01); *C04B 2235/94* (2013.01); *C04B 2237/086* (2013.01); *C04B 2237/363* (2013.01); *C04B 2237/365* (2013.01); *C04B 2237/385* (2013.01)

(58) Field of Classification Search
None
See application file for complete search history.

(56) References Cited

U.S. PATENT DOCUMENTS

| 6,025,062 | A | 2/2000 | Krenkel et al. |
| 6,029,346 | A | 2/2000 | Chellappa |
| 2002/0068164 | A1 | 6/2002 | Martin |
| 2003/0059577 | A1 | 3/2003 | Morrison et al. |
| 2004/0175553 | A1 | 9/2004 | Bouillon et al. |
| 2005/0254942 | A1 | 11/2005 | Morrison et al. |
| 2010/0000831 | A1 | 1/2010 | Faria et al. |
| 2010/0139841 | A1 | 6/2010 | Siegel et al. |
| 2011/0020130 | A1 | 1/2011 | Murakami et al. |
| 2011/0265406 | A1 | 11/2011 | Morrison et al. |
| 2013/0106010 | A1 | 5/2013 | Kienzle et al. |

FOREIGN PATENT DOCUMENTS

| DE | 102010030552 A1 | 12/2011 |
| DE | 102011007815 A1 | 10/2012 |
| EP | 1367037 A2 | 12/2003 |
| EP | 2 363 574 A2 | 9/2011 |
| EP | 2837796 A1 | 2/2015 |
| WO | WO 2010/077401 A2 | 7/2010 |
| WO | WO 2013/154007 A1 | 10/2013 |
| WO | WO 2014/031202 A2 | 2/2014 |

OTHER PUBLICATIONS

GB Search Report dated Apr. 29, 2014 from related GB 1319366.9.
International Preliminary Report on Patentability and Written Opinion dated May 12, 2016 from corresponding PCT/EP2014/073259.
International Search Report and Written Opinion dated Dec. 15, 2014 issued in PCT/EP2014/073259.
Extended European Search Report dated Jan. 2, 2014 issued in EP 132752767.
GB Search Report dated Apr. 29, 2015 issued in GB 1419251.2.

*Primary Examiner* — Robert T Butcher
(74) *Attorney, Agent, or Firm* — Scully, Scott, Murphy & Presser, PC

(57) ABSTRACT

A method of manufacturing ceramic matrix composite objects is disclosed. The method comprises the steps of providing first and second substantially two dimensional arrangements of one or more fiber plies, and machining the first and second arrangements to predetermined configurations to form first and second preforms. The second preform is made to conform to a surface of the first preform such that at least some of the fibers of the second preform are orientated at least partially in a plane outside that defined by the fibers of the first preform, and fixed to the first preform to form a combined first and second preform. The combined first and second preform is rigidized. Ceramic matrix composite objects manufactured by this method are also disclosed.

12 Claims, 4 Drawing Sheets

METHOD OF MANUFACTURING CERAMIC MATRIX COMPOSITE OBJECTS

The present invention relates to a method of manufacturing ceramic matrix composite objects. The method is particularly suited to the manufacture of objects in which the ceramic matrix composite comprises fibrous reinforcing elements, and where a fibre architecture having a three dimensional character is preferable.

Ceramic matrix composites comprise fibres embedded in a matrix material. They are known for their ability to withstand high temperatures and are applied in, for example, automotive braking systems. In such systems, predominantly two dimensional fibre architectures are used. In other words, in a composite object extending in three dimensions (say, x, y, and z), the fibres will extend predominantly in the x and y directions, and not in the z direction. This structure is suitable because the loads are applied principally in one plane only, and is a result of the manner in which fibre plies are laid up during manufacture of the composite. In order to exploit the benefits of ceramic matrix composites in other fields, however, where it is not possible to restrict applied loads in such a way, it is beneficial to use three dimensional fibre matrix structures. For example, components such as vanes or turbine blades for jet engines are required to withstand high temperatures, and may benefit from the properties of ceramic matrix composites. However, such components, in use, are often subject to complex three-dimensional load patterns. Two dimensional fibre architectures are typically unable to support such three dimensional load patterns.

It is known from International Patent Application Publication Number WO2010/077401, and from US Patent Application Publication Number US20110020130 to form turbine blades from ceramic matrix composites.

It is known from U.S. Pat. No. 6,025,062 to form cogged components, especially wheels, racks, pinions, splines or similar structures, intended for the mechanical transmission of force, from fibre-reinforced ceramic.

In accordance with a first aspect of the present invention, there is provided a method of manufacturing a ceramic matrix composite object comprising the steps of: providing a first, substantially two dimensional arrangement of one or more fibre plies, and machining to a predetermined configuration to form a first preform; providing a second, substantially two dimensional arrangement of a number of fibre plies, and machining to a predetermined configuration to form a second preform; conforming the second preform to a surface of the first preform such that at least some of the fibres of the second preform are orientated at least partially in a plane outside that defined by the fibres of the first preform; fixing the first and second preforms together to form a combined first and second preform; and rigidising the combined first and second preform.

In accordance with a second aspect of the invention, there is provided a method of manufacturing a ceramic matrix composite object comprising the steps of: providing a first arrangement of one or more fibre plies, and machining the first arrangement to a predetermined configuration to form a first preform; providing a second arrangement of one or more fibre plies, and machining the second arrangement to a predetermined configuration to form a second preform; wrapping the second preform around at least one edge of the first preform; fixing the first and second preforms together to form a combined first and second preform; and rigidising the combined first and second preform.

The second preform may be configured to be flexible.

In one embodiment, the ceramic matrix composite is a carbon-silicon carbide ceramic matrix composite.

The step of rigidising the combined first and second preforms may comprise pyrolysing the combined first and second preforms.

The step of rigidising the combined first and second preforms may comprise increasing the carbon content of the combined first and second preforms using a chemical vapour infiltration process.

The step of rigidising the combined first and second preforms may comprise infiltration of the combined first and second preforms with a liquid material, the liquid material being selected to react with a component of the first and second preforms so as to form a ceramic. The liquid material may be liquid silicon.

In one embodiment, the step of fixing the second preform to the first preform comprises applying an adhesive to one of the first or second preforms, the adhesive being selected to yield a high carbon content when pyrolysed. The adhesive may be a phenolic- or pitch-based adhesive.

The method may further comprise providing one or more further arrangements of one or more fibre plies, machining the one or more further arrangements to a predetermined configuration to form one or more further preforms; and successively adhering each of the one or more further preforms to the combined first and second preform to form a complete preform in which at least one of the one or more further preforms are wrapped around one of the first, second, or one or more further preforms.

The one or more further preforms may be configured to remain flexible.

The invention extends to a ceramic matrix composite object manufactured by the above method.

In accordance with a further aspect of the invention, there is provided a ceramic matrix composite object comprising a plurality of fibres embedded in a ceramic matrix, wherein the fibres are arranged in a plurality of layers, each layer being a substantially two dimensional arrangement of fibres, and wherein a first of the plurality of layers is conformal with a surface of a second of the plurality of layers such that at least some of the fibres of the second layer are at least partially orientated in a plane outside that defined by the fibres of the first layer. The ceramic matrix composite object may be manufactured by the above method.

In accordance with a further aspect of the invention, there is provided apparatus comprising first and second components formed of a material comprising fibres embedded in a ceramic matrix material, the first component being joined to the second component at a join surface; the matrix material being continuous across the join surface and the fibres being arranged not to pass through the join surface, such that the apparatus is frangible at the join surface. The first and second components may be manufactured by the above method.

The above and further features of the invention are set forth with particularity in the appended claims and will be described hereinafter with reference to the accompanying drawings in which:

Figure 1:
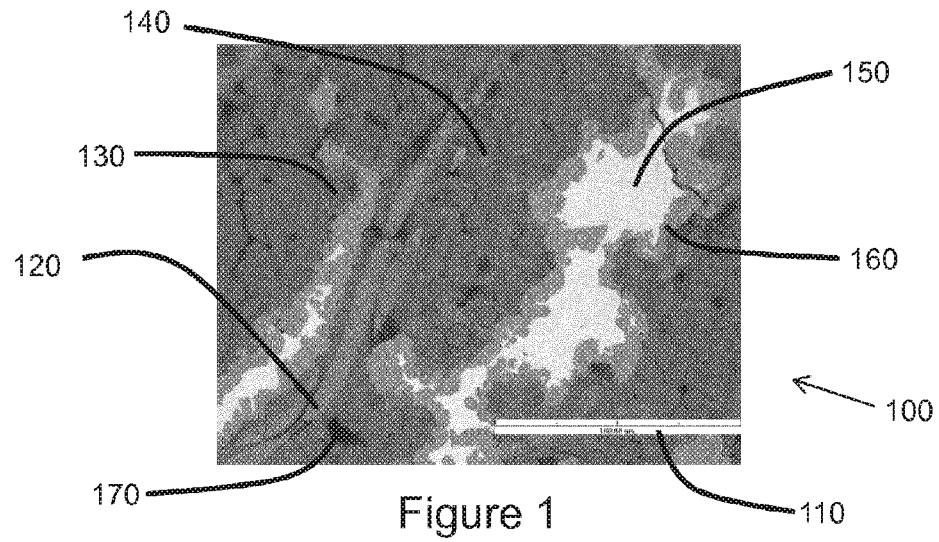
FIG. 1 is an illustration of the microstructure of a ceramic matrix composite.

Ceramic matrix composite materials comprise fibres, or other reinforcing elements, embedded in a ceramic matrix. For example, carbon-fibre embedded in silicon carbide is one ceramic matrix composite, and will be referred to herein as C-SiC. FIG. 1 is a micrograph of a sample of C-SiC 100, in which the various components of the microstructure can be seen. The scale 110 of this image is such that the width of the micrograph represents approximately 200 µm. The reinforcing carbon fibres can be identified running within the plane of the micrograph (fibre 120) and, in cross-section, running perpendicular to the plane of the micrograph (fibre 130, and other similarly sized circular cross-sections). Notably the fibres run predominantly perpendicularly to the plane of the micrograph, with only one fibre—fibre 120—running in the plane of the micrograph. Region 140 and similar shaded areas are regions of non-fibrous carbon, incorporated into the material but not converted to silicon carbide. Region 150 and similar shaded areas are likewise regions of silicon incorporated into the material but not converted to silicon carbide. Region 160 and similar shaded areas are regions of silicon carbide. Finally, region 170 and similar shaded areas are voids in the microstructure, demonstrating that the microstructure has a degree of porosity.

Figure 2:
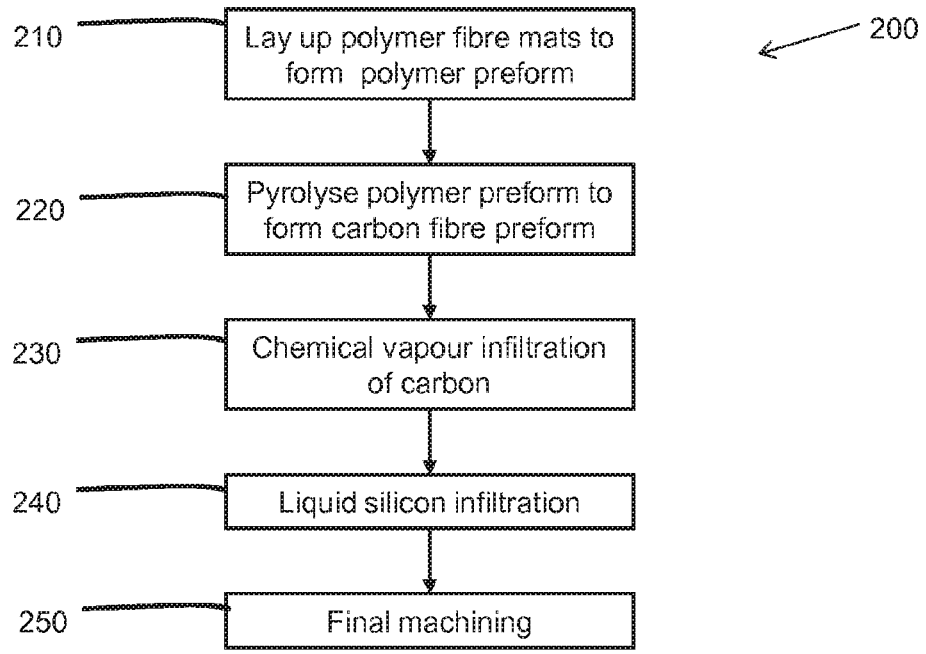
FIG. 2 is a flow chart indicating a known method of manufacture of a ceramic matrix composite.

Various methods of manufacture of this material are known. One exemplary known method is the liquid silicon infiltration process. This process was used to manufacture the sample of C-SiC 100 that is illustrated in FIG. 1. In broad terms, the liquid silicon infiltration process follows the steps set out as a flow chart 200 in FIG. 2. At step 210, the polymer fibre plies are laid up in a desired configuration. The laid up plies are then pyrolysed at step 220, converting the polymer to carbon. Additional carbon is incorporated into the material via chemical vapour infiltration at step 230. Liquid silicon infiltration is then performed at step 240. The silicon at least partially reacts with the carbon to form silicon carbide. The resulting material can then be machined as necessary at step 250 to produce a finished object.

Figure 3:
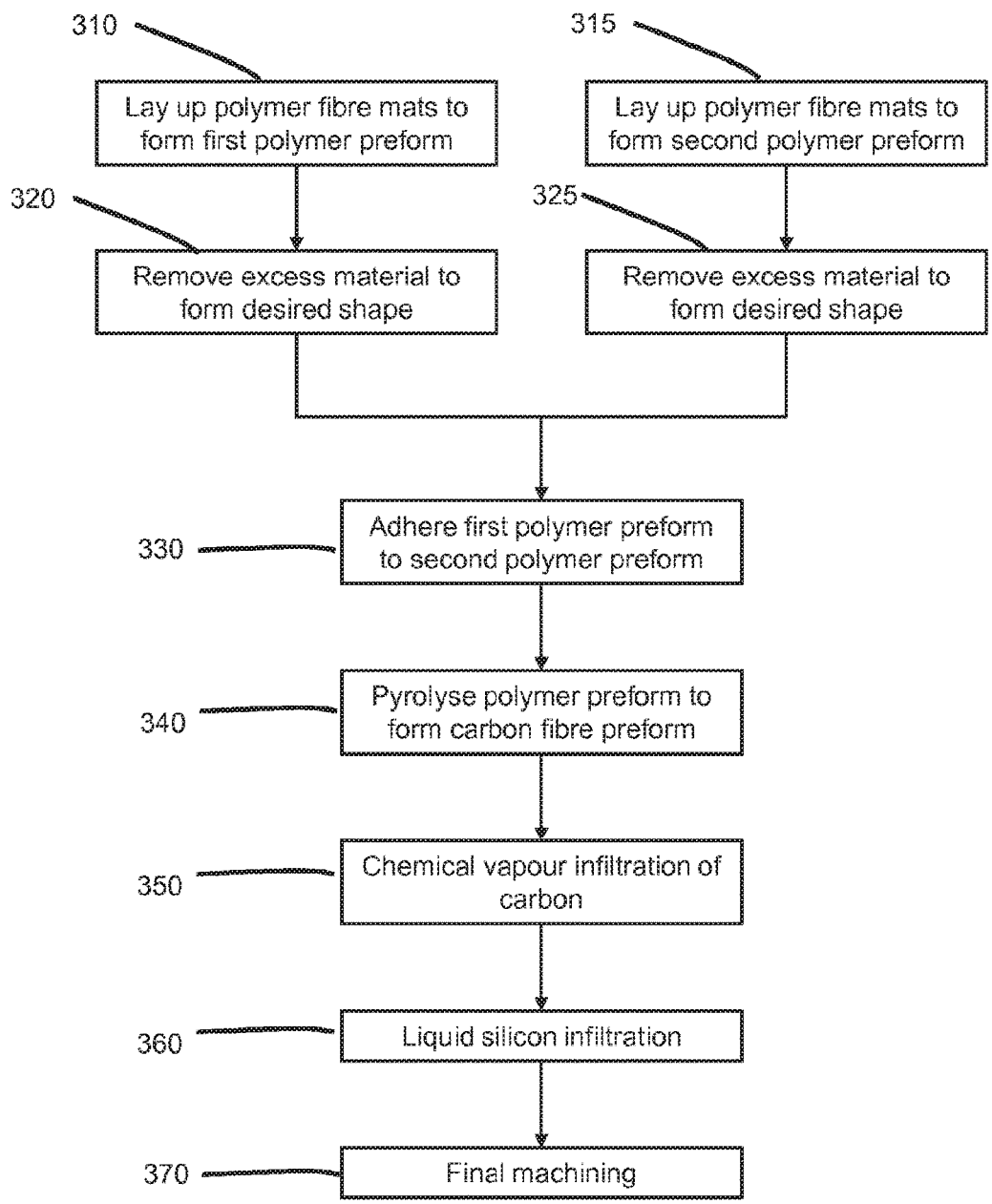
FIG. 3 is a flow chart illustrating the steps manufacture of a ceramic matrix composite object in accordance with the first embodiment of the invention.

A method of manufacture of a ceramic matrix composite in accordance with a first embodiment of the invention is illustrated in the flow chart 300 shown in FIG. 3. The method illustrated in flow chart 300 is a modification of that illustrated in flow chart 200 and described above with reference to FIG. 2.

Figure 4:
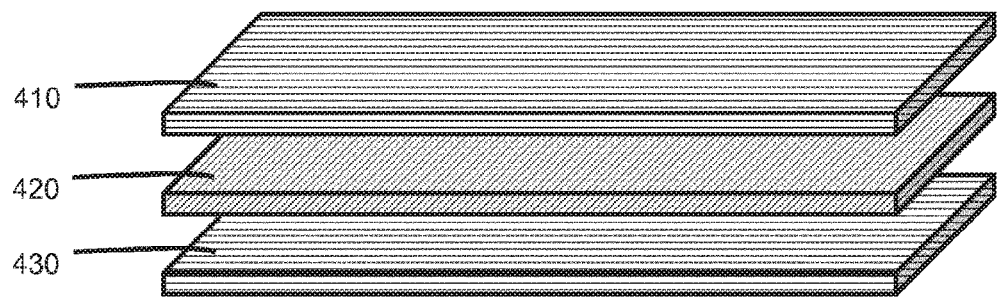
FIG. 4 is a schematic illustration of a first stage in a method of manufacture of a ceramic matrix composite in accordance with a first embodiment of the invention.

The first step of the manufacture, illustrated at step 310, is the formation of a fibre preform. This fibre preform is prepared from a PANOX® material. PANOX® consists of partially oxidised polyacyrlonitrile fibres, and is available from the SGL Group (SGL CARBON SE, Söhnleinstrasse 8, 65201 Wiesbaden, Germany). The plies of PANOX® fibres used consist of a number of inner layers of unidirectional fibres, and outer layers consisting of short, randomly aligned fibres. The outer layers serve to hold the layers of unidirectional fibres together. A number of such plies are layered together. In the present embodiment, the orientation of the fibres the plies alternates, one layer being orientated at 0° to a defined axis along the edge of the mat, and the next at 90° to that axis. Such orientations are selected to maximise the strength of the final composite object in particular directions, and are selected in dependence on the application of the final composite object. FIG. 4 schematically illustrates the alternation of the fibre alignment for three fibre plies 410, 420, and 430. For clarity, only three plies are shown, and it will be noted that the lay-up is shown in exploded form. In plies 410 and 430, the fibres of the plies are aligned along the long edge of the plies, in the horizontal direction as shown. In mat 420, positioned between plies 410 and 420, the fibres of the mat are aligned out of the plane of the illustration, perpendicularly to those of plies 410 and 430.

The plies laid up as described above are not bonded together except by friction. They may be held together in the direction perpendicular to the plane of the unidirectional fibres (the 'z-direction') for the benefit of subsequent processing stages in a number of ways. In the present embodiment, a needling operation is applied once a small number of plies have been laid up. In the needling operation, a barbed needle is inserted into the plies, and then pulled back through in order to draw some of the randomly orientated fibres through the laid up structure in the z-direction. The needling operation is then repeated once further plies are added, since the needle may penetrate only a few layers into the laid up structure. Other methods of holding together the plies are also known, such as the use of additional fibres to stitch the plies together.

Figure 5A:
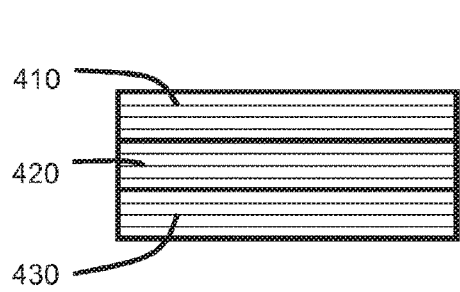
FIGS. 5a to 5d are schematic illustration of steps in a second stage of the method of the first embodiment.
Figure 5B:
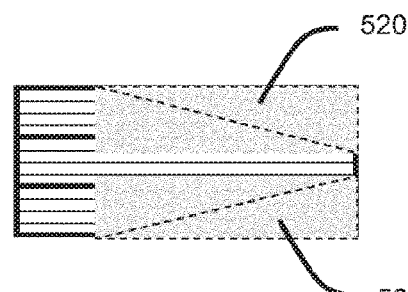

The laid-up PANOX® preform, formed as described above, is then machined to remove excess material at step 320, for example using an appropriate cutting tool. This process is schematically illustrated in FIGS. 5(a) and (b) described in further detail below. It will be noted that within this first PANOX® preform, the fibres are orientated within one plane, albeit with alternating alignments within that plane.

A second PANOX® preform is formed at steps 315 and 325. Steps 315 and 325 are performed in the same way as steps 310 and 320 described above, and will not be described further, except for noting that the shape of the second PANOX® preform is different to that of the first. In the present embodiment, as is described in further detail below with reference to FIG. 5, the different shape is required because the second preform is to be wrapped around the first. In addition, because the second preform is to be wrapped around the first, it must retain an element of flexibility, and so in the present embodiment it is preferable to use a small number of plies in the second preform.

Figure 5C:
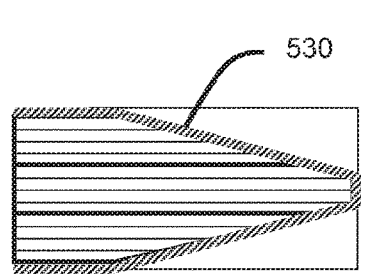
Figure 5D:
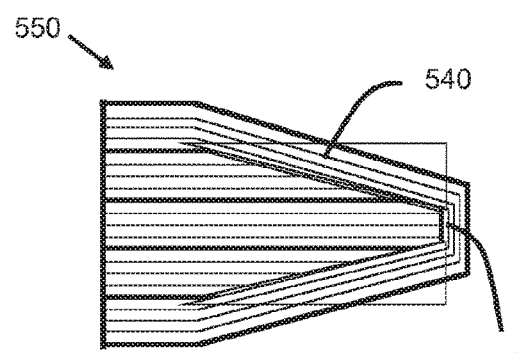

The next step 330 in the manufacture of the ceramic matrix composite object is the fastening together of the first PANOX® preform and the second PANOX® preform. Various stages of this process are illustrated in FIGS. 5(a) to (d). FIG. 5(a) illustrates the first PANOX® preform 510, comprising the individual fibre plies 410, 420, and 430. It should be noted that the alternating orientations of the fibres in each of the plies 410, 420, and 430 is not shown in the schematic illustrations of FIGS. 5(a) to (d) for the purposes of clarity. In the present embodiment, a fin for aerospace application is to be manufactured, and it is necessary to remove material from the first preform as indicated schematically in FIG. 5(b) in order to form the correct precursor shape for the fin. As shown, regions 520 and 525 are to be removed from the preform. This gives the first preform a slightly pointed profile. An adhesive is applied to the surface of the first PANOX® preform as is shown in FIG. 5(c). The adhesive 530 covers the surface of the first PANOX® preform. The second PANOX® preform 540 is then brought into contact with the adhesive-covered surface and wrapped around the first laid up mat. The second preform is wrapped around the pointed profile of the first preform defined by the removal or regions 520 and 525, as illustrated in FIG. 5(d).

As shown in FIG. 5(d), the second preform comprises only one ply, rather than the three used in the first preform. The use of a lower number of plies in the second preform results in the second preform retaining a high degree of flexibility, such that it can be moulded round the edge region of the first preform. The resulting configuration 550 is illustrated schematically in FIG. 5(d). As a result of the wrapping of the second of the laid up plies, a number of fibres of the second mat, in the region 560 where it curves around the first mat, will partially be orientated in a direction out of the plane defined by the fibres of the first mat. As illustrated, in part the fibres will in fact be orientated perpendicularly to the plane of the first preform.

The adhesive used has a high carbon content. In the present embodiment, the phenolic-based adhesive Redux 775 (available from Hexcel Corporation, 281 Tresser Boulevard, 16th Floor, Stamford, Conn. 06901-3261, USA) is used. The use of such high carbon-content adhesives is preferred because, during subsequent pyrolysis, the adhesive will also decompose to carbon. This results in the adhesive bond between the first and second preforms persisting after pyrolysis, at least to a degree that enables the subsequent processing steps to be completed.

The combined first and second preforms are then converted to a carbon fibre preform using pyrolysis at step 340. During pyrolysis, both the polymer fibres of the plies and the adhesive thermally decompose to carbon. To achieve this, the combined first and second preforms are subjected to a temperature of approximately 2000° C. in an inert atmosphere. This process for the production of carbon fibre is known, and it will be appreciated that the temperature used may be lower than 2000° C. For example, a temperature of 1400° C. or any temperature above 1100° C. may be used. Typically, during pyrolysis, the fibres are held under tension, but in the present embodiment there is no application of tension.

The next stage 350 in the manufacture of the ceramic matrix composite is the production of a porous carbon-carbon preform. In the present embodiment, this is accomplished using chemical vapour infiltration. One such method is described in International Patent Application, publication number WO2007/012865. A low molecular weight hydrocarbon, such as methane, is supplied to the preform under pressure and at high temperature, resulting in the thermally-induced breakdown of the hydrocarbon. Gaseous methane, introduced into a chamber at a temperature of approximately 1100° C., in which the fabric preform is placed, breaks down into solid carbon, which is deposited around and within the fabric preform, and gaseous hydrogen. The chemical vapour infiltration process can take between 7 and 14 days, although it can be continued for longer periods for the production of higher density structures. For example, it may be continued for 21 days.

Subsequent to the chemical vapour infiltration process, the preform is further machined to the desired shape of the final object. Machining at this stage is significantly easier than machining the final ceramic matrix composite material. In some embodiments, it may be desirable to repeat the chemical vapour infiltration process after the machining, or to operate a number of cycles of chemical vapour infiltration and machining, in order to achieve the correct density of the preform. An advantage of machining the preform subsequent to chemical vapour infiltration is the enhanced porosity of the final carbon-carbon preform, which facilitates the subsequent incorporation of silicon.

The carbon-carbon preform is then infiltrated with silicon through a process of liquid silicon infiltration at step 360. In broad terms, liquid silicon infiltration involves the infusion of liquid silicon into the carbon-carbon preform, where it reacts with the carbon to form silicon carbide. The porous carbon-carbon preform is covered in silicon powder, and then heated to a temperature above the melting point of silicon of approximately 1400° C., and preferably above 1600° C. A temperature of approximately 2000° C. is used in the present embodiment. Between 500 kg and 1000 kg of silicon powder is used for each cubic meter of the carbon-carbon preform.

The silicon powder melts and infiltrates the carbon-carbon preform, where it reacts with the carbon to produce silicon carbide. The use of a high temperature of around 2000° C. enhances the speed of the reaction between the silicon and the carbon, and promotes a more complete conversion of the precursor materials to silicon carbide. The silicon carbide is solid on formation at this temperature. This hampers the ongoing reaction, since the liquid silicon must then diffuse through, or otherwise move around, the solid silicon carbide layer. However, during subsequent cooling, the mismatch between the thermal expansion coefficients of the carbon fibres and the silicon carbide can lead to cracking of the silicon carbide. A secondary heat treatment is then applied, during which further conversion of silicon to silicon carbide is enabled by the new flow paths opened by the cracks that have developed during the initial cooling.

The above method is thought to be particularly suitably for the construction of an aerodynamic fin for a missile, or other flying vehicle, from ceramic matrix composite material. The method enables the orientation of the fibres within the fin to be varied so as to better support the varying load patterns to which the fin may be subjected in flight, and provides a relatively straightforward method of manufacture that maintains strong adhesion between the different preforms within the eventual structure, which, through the various stages of fabrication, are made to be effectively integral with one another. For example, applying the step of liquid silicon infiltration at the end of the process, once the preforms have been adhered to each other, ensures that there will be effectively continuous regions of silicon carbide across the boundaries between regions defined by the preforms used to fabricate the structure.

Figure 6:
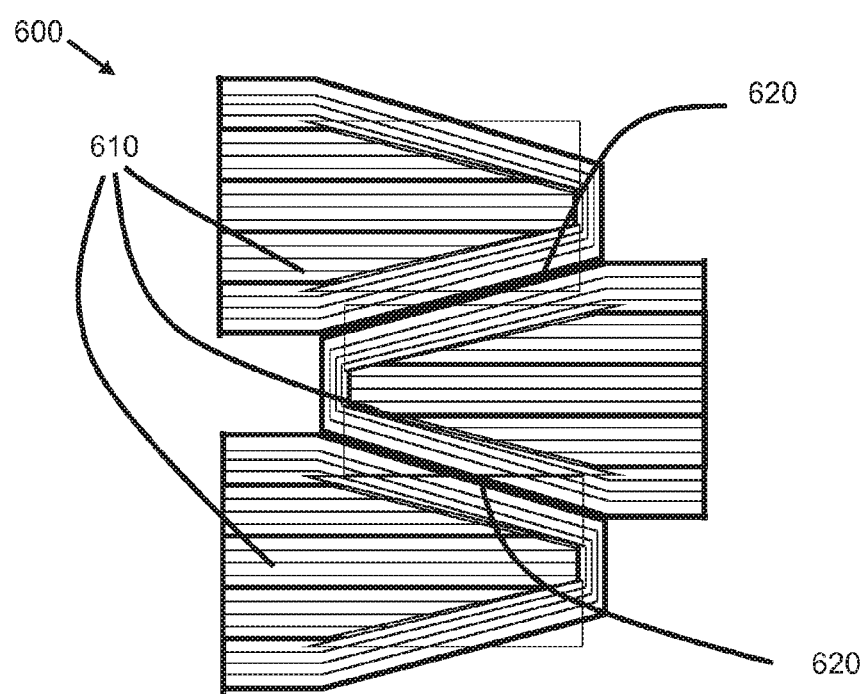
FIG. 6 is a schematic illustration of apparatus in accordance with an embodiment of the invention.

FIG. 6 is a schematic illustration of apparatus 600 according to a further embodiment of the invention. Apparatus 600 comprises three components 610 joined together along join surfaces 620. The apparatus 600 is made according to the above described method, except in that the lay-up of the fibre plies is configured to create the join surfaces 620. Each of the components 610 are laid up separately, with the various fibre plies laid up as described above. The components each have a number of fibre plies aligned in one plane, as well as one fibre ply that is wrapped around the aligned fibre plies. Once each of the components is laid up, adhesive is applied to the surfaces to be joined, and the components joined together. Subsequently, the apparatus is pyrolysed and processed as described above. During the pyrolysis and subsequent processing, the adhesive applied at the join surfaces is converted to matrix material, such that the matrix material is continuous across the join surfaces. None of the reinforcing fibres, however, pass through or intersect with the join surface. In the present embodiment, the in the immediate vicinity of the join surfaces run parallel to the join surfaces.

On application of a mechanical force to the material, the apparatus will break preferentially along the join surfaces 620. Since no fibres traverse the join surface, the material in the region of the join surfaces is the brittle ceramic matrix material. Thus the apparatus is configurable to break up in a controlled manner. It will be appreciated therefore that the apparatus 600 can be used as a frangible cover. For example, it may be used to form the cover of a canister from which a missile is to be launched, the mechanical force being provided in that instance by the launch of the missile. It will be appreciated that the location and orientation of the join surface can be selected and configured as required for a particular application through appropriate lay-up of the fibre plies in the initial processing steps. Thus many other applications for the apparatus 600 are possible, particularly in aerospace vehicles.

Alternative methods of manufacture of apparatus 600 are also possible. For example, it will be understood that adhesion of the components 610 could be performed at a later stage of the manufacture of the components, such as after the components have gone through a stage of chemical vapour infiltration to increase the carbon content prior to liquid silicon infiltration. At this stage, the component preforms are rigid, but can be adhered with a high-carbon-content adhesive and subsequently re-pyrolysed prior to liquid silicon infiltration. In such a case, it may be that the fibres in the vicinity of the join surfaces terminate, rather than running parallel to the join surface as described above. However, none of the fibres will traverse or intersect the join surface.

Whilst a number of specific embodiments of the invention have been described in the above, it is to be noted that variations and modifications are possible without departing from the scope of the present invention which is defined in the accompanying claims. For example, although the above described embodiment relates to the carbon-silicon carbide ceramic matrix fibre composite, it will be appreciated that the invention may be applied to other ceramic matric composites. It is anticipated that the invention will be most effective for those ceramic matrix composites formed by a process incorporating a melt infiltration and reaction step, analogous to the liquid silicon infiltration process described above, or materials requiring a pyrolysis process. Examples include carbon-carbon composites, and silicon carbide-silicon carbide, both of which can be produced using methods similar to that described above. In the case of carbon-carbon composites, it will be appreciated that the step of liquid silicon infiltration is not required, whilst in the case of silicon carbide-silicon carbide, it will be necessary to lay up silicon carbide fibres. Other exemplary matrix materials include silicon carbonitride, and Blackglas®, a proprietary material available from Honeywell.

It will also be appreciated that other embodiments of the method described in detail in the above will be possible for the purposes of making other shapes or configurations of ceramic matrix composite objects through the alteration of the sizes, shapes, or wrapping configurations used for the first and second PANOX® preforms. In addition, it will be noted that more than two PANOX® preforms may be combined in order to obtain a wider variety of shapes, with fibre orientations being configurable to suit the load patterns to which the final object is to be subjected. Thus, it may be desired to add further polymer preforms to the first and second preforms of the above-described embodiment, for example a third polymer preform wrapped around the first and second polymer preforms, but wrapped in a direction perpendicular to the second. Those skilled in the art will readily arrive at further useful configurations. Furthermore, it will be noted that the degree of flexibility of the second or further preforms may, in some configurations, allow for a greater thickness of the second preform. Where small bend radii are required in conjunction with thicker outer layers, it will of course be possible to a number of outer preforms in succession, building up to the desired thickness. In the above described embodiment, where the object to be manufactured is a fin, although it has been described to use only one ply of PANOX® fibres in the second preform, it is anticipated that it would be feasible to use up to three or five plies without losing the required flexibility. In other configurations, without small bend radii, larger numbers of plies could be incorporated.

Within each mat, a number of orientations for the fibres in each layer are possible in addition to the alternating 0°/90° configuration described in the above. For example, it is possible to align the fibres alternately at +45°/−45° to the axis, or alternately at 0°/60° to the axis. Other orientations, including other alternating arrangements and unidirectional alignments, are possible and can be applied in dependence on the strength required of the final object in particular directions.

It should also be noted that other precursor materials can be used in place of those described above to form carbon-silicon carbide ceramic matrix composite objects. For example, the PANOX® fibres described in the above are one of a number of potential polymer fibres that can be used as a precursor material in the formation of carbon fibre by pyrolysis. Other polyacrylonitrile fibres, oxidised or otherwise may be used, as well as other polymer fibres known to those skilled in the art for application as precursor materials in the production of carbon fibre. Moreover, it will be possible to lay up carbon fibre plies, rather than using a polymer precursor material. In addition, other types of adhesive can be used instead of the exemplary pitch-based adhesive described in the above to fasten the preforms together. Those skilled in the art will appreciate that any adhesive giving a high carbon yield upon pyrolysis could be used for the production of carbon-silicon carbide structures. Thus, other phenolic-based adhesives may be used, or pitch or bitumen based adhesives may be used, such as Cold Bitumen Adhesive (available from Iko PLC, Coney Green Road, Clay Cross, Chesterfield, Derbyshire, S45 9HZ, UK). Moreover, those skilled in the art will also appreciate that other adhesives will be suitable if the invention is to be applied to other types of ceramic matrix composite. Those skilled in the art will be readily able to determine suitable adhesives for particular chemistries of ceramic matrix composite.

In addition, those skilled in the art will appreciate that it is possible to compress the preforms before the stage of pyrolysis, so as to obtain a higher carbon density in the finished structure. Such compression may be achieved by clamping the preforms together, or applying high pressures though other means. Compression may have the additional advantage of enhancing the strength of the adhesion between the preforms at this stage.

It will also be possible to fix the preforms together using methods other than adhesion. For example, mechanical fastening of the preforms together may be applied, such as by stitching the preforms together with additional PANOX® fibres, or other polymer, ceramic, or carbon fibres. The step of fixing together the polymer preforms may also be performed either immediately after lay-up of the polymer plies, as described in the above, or following the step of pyrolysis. In the event that the fixing step is to be applied after pyrolysing the polymer plies, however, it will be noted that a further step of pyrolysis may be required in order to thermally decompose the adhesive to carbon. As will be understood by those skilled in the art, the fixing step can be applied at any point after the lay-up of the polymer plies, but prior to the step of liquid silicon infiltration.

It may also be desired to graphitise the carbon-carbon preform by subjecting the carbon-carbon preform, post chemical vapour infiltration, to high temperatures (between approximately 2000° C. and 2400° C.) for approximately 96 hours. Graphitisation can improve frictional stability and thermal conductivity of the resulting C-SiC ceramic matrix composite.

It will be appreciated by those skilled in the art that, instead of using a chemical vapour infiltration process to produce the carbon-carbon preform, as is described in the above, it is alternatively possible to use a pyrolysed polymer matrix composite to produce the carbon-carbon preform. The use of a pyrolysed polymer matrix composite can be less costly, but the final C-SiC composite may also exhibit a lower strength than a C-SiC composite obtained using CVI-based processes.

Higher temperatures can also be used for LSI, with the benefit that processing is faster, but at the cost of higher energy use. In addition, the use of higher temperatures leads to higher internal stresses being created in the microstructure of the final product as a result of the thermal expansion mismatches between the different components of the final material. Such higher internal stresses risk increasing the number of internal defects and may also reduce the strength of the final material.

Those skilled in the art will also appreciate that, whilst a particular order of fabrication steps has been described with regard to specific embodiments (and particularly with reference to FIG. 3), it will be possible to vary the order of the steps, and particularly the stage at which the preforms are joined together. For example, it may be desired to pyrolise one or both of the first and second preforms prior to machining and adhering the two preforms. It may desired to pyrolise and apply the step of chemical vapour infiltration to one or both of the first and second preforms prior to machining and adhering the two preforms. In these cases, additional processing of the preforms prior to the step of wrapping the second preform around part of the first has the disadvantage that the second preform becomes less flexible, and may result in a weaker attachment between the preforms. However, these steps may be applied only to the first preform, such that the second preform retains its full flexibility; and may have the advantage that the shape of the first preform can be more precisely defined. Moreover, it is expected that sufficient mechanical integrity will be retained by ensuring that the step of liquid silicon infiltration is performed when the preforms are together.

Finally, it should be clearly understood that any feature described above in relation to any one embodiment may be used alone, or in combination with other features described, and may also be used in combination with one or more features of any other of the embodiments, or any combination of any other of the embodiments.

The invention claimed is:

1. A method of manufacturing a ceramic matrix composite object comprising the steps of:
   (i) providing a first arrangement of one or more fibre plies, and machining the first arrangement to a predetermined configuration to form a first preform;
   (ii) providing a second arrangement of one or more fibre plies, and machining the second arrangement to a predetermined configuration to form a second preform;
   (iii) wrapping the second preform around at least one edge of the first preform;
   (iv) fixing the first and second preforms together to form a combined first and second preform;
   (v) providing one or more further arrangements of one or more fibre plies, machining the one or more further arrangements to a predetermined configuration to form one or more further preforms; and successively adhering each of the one or more further preforms to the combined first and second preform to form a complete preform in which at least one of the one or more further preforms are wrapped around one of the first, second, or one or more further preforms; and
   (vi) rigidizing the complete preform by a step comprising infiltrating the combined first and second preforms with a liquid material, the liquid material selected to react with a component of the first and second preforms so as to form a ceramic.

2. A method as claimed in claim 1, wherein the second preform is configured to be flexible.

3. A method as claimed in claim 1, wherein the ceramic matrix composite is a carbon-silicon carbide ceramic matrix composite.

4. A method as claimed in claim 1, wherein the step of rigidising the combined first and second preforms comprises pyrolysing the combined first and second preforms.

5. A method as claimed in claim 1, wherein the step of rigidising the combined first and second preforms comprises increasing the carbon content of the combined first and second preforms using a chemical vapour infiltration process.

6. A method as claimed in claim 1, wherein the liquid material is liquid silicon.

7. A method as claimed in claim 1, wherein the step of fixing the second preform to the first preform comprises applying an adhesive to one of the first or second preforms, the adhesive being selected to yield a high carbon content when pyrolysed.

8. A method as claimed in claim 7, wherein the adhesive is a phenolic- or pitch-based adhesive.

9. A method as claimed in claim 1, wherein the one or more further preforms are configured to remain flexible.

10. A method as claimed in claim 1, wherein, in step (iii) at least some of the fibers of the second preform are at least partially oriented in a plane outside that defined by fibers of the first preform.

11. A method as claimed in claim 1, wherein the ceramic matrix composite object is an aerodynamic fin.

12. A method of manufacturing a ceramic matrix composite object in the shape of an aerodynamic fin, the method comprising the steps of:
   (i) providing a first arrangement of one or more fibre plies, and machining the first arrangement to a predetermined configuration to form a first preform;
   (ii) providing a second arrangement of one or more fibre plies, and machining the second arrangement to a predetermined configuration to form a second preform;
   (iii) wrapping the second preform around at least one edge of the first preform;
   (iv) fixing the first and second preforms together to form a combined first and second preform in the shape of an aerodynamic fin; and
   (v) rigidising the combined first and second preform.

* * * * *